(12) United States Patent
Li et al.

(10) Patent No.: US 9,384,243 B2
(45) Date of Patent: Jul. 5, 2016

(54) REAL-TIME TREND DETECTION IN A SOCIAL NETWORK

(71) Applicant: Facebook, Inc., Menlo Park, CA (US)

(72) Inventors: Jun Li, Sammamish, WA (US); Li Ju, Woodinville, WA (US); Bradley Green, Snohomish, WA (US); Lars Backstrom, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 138 days.

(21) Appl. No.: 13/961,789

(22) Filed: Aug. 7, 2013

(65) Prior Publication Data

US 2015/0046436 A1  Feb. 12, 2015

(51) Int. Cl.
*G06F 17/30* (2006.01)
(52) U.S. Cl.
CPC ................... *G06F 17/3053* (2013.01)

(58) Field of Classification Search
CPC combination set(s) only.
See application file for complete search history.

(56) References Cited

U.S. PATENT DOCUMENTS

| 7,337,201 | B1* | 2/2008 | Yellin et al. | |
|---|---|---|---|---|
| 2003/0110088 | A1* | 6/2003 | Starmer et al. | 705/26 |
| 2008/0097805 | A1* | 4/2008 | Wells | G06Q 20/02 705/30 |
| 2009/0307610 | A1* | 12/2009 | Ryan | G06Q 10/00 715/756 |
| 2010/0280976 | A1* | 11/2010 | Carpenter et al. | 705/500 |
| 2012/0005224 | A1* | 1/2012 | Ahrens | G06Q 10/10 707/769 |
| 2012/0030018 | A1* | 2/2012 | Passmore et al. | 705/14.52 |

* cited by examiner

*Primary Examiner* — Etienne Leroux
(74) *Attorney, Agent, or Firm* — Nicholson De Vos Webster & Elliott LLP

(57) ABSTRACT

Systems, methods, and apparatuses for tracking trends at an online presence are described. In some embodiments, an interactivity data structure and a tenured interactivity data structure are utilized in determining trends quickly.

20 Claims, 10 Drawing Sheets

REAL-TIME TREND DETECTION IN A SOCIAL NETWORK

FIELD

Embodiments of the invention are related to the field of social networking. More specifically, the embodiments are related to identifying trending objects.

BACKGROUND

Tracking items that are popular over a period of time (trending) is a way for an online enterprise (such as a social networking system or website) to enhance user experience and keep users engaged. With a trending service, the online enterprise detects and provides trending objects for users. Trending objects are objects that are popular at a moment, at an online enterprise and/or in the physical world. A trending object can be a uniform resource locator (URL), a hashtag, a topic, a page, a subscription, an online group, a user profile, an application software, and any other entities that likely attract a user's interest and impel the users' interaction thus generate more content at the social networking system. However, at some online enterprises, millions and millions of users generate content on their own or share content with others, it is challenging to sift through the massive amount of data and identify trending objects for users.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

Embodiments of Social Networking Systems

Figure 1:
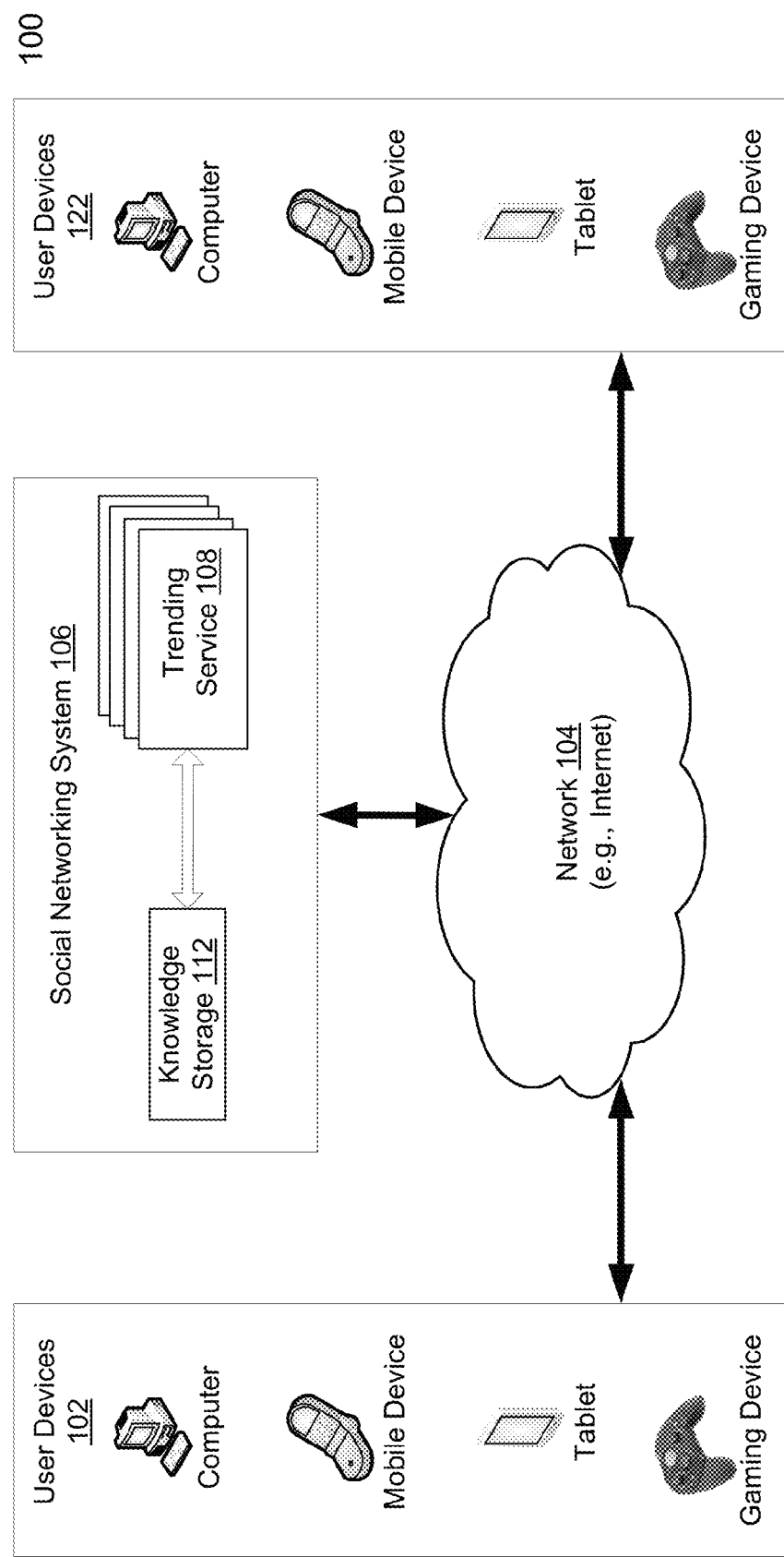
FIG. 1 is a block diagram illustrating a social networking system according to one embodiment of the invention.

FIG. 1 is a block diagram illustrating a social networking system according to one embodiment of the invention. Referring to FIG. 1, user devices 102 and 122 communicate with social network system 106 through network 104. Network 104 may be any type of network such as a local area network (LAN), a wide area network (WAN) such as Internet, a corporate intranet, a metropolitan area network (MAN), a storage area network (SAN), a bus, or a combination thereof, wired and/or wireless. User devices 102 and 122 may be any device communicatively coupled to network 104, such as computers, mobile devices (cellphones, wearable computing devices, automobile based Internet devices, etc.), smart TVs/ setup boxes, Internet gaming devices, a personal digital assistant (PDA), a Web enabled system, a media player, a "thin" client, etc.

Social networking system 106 operates a social network site, platform, or an online service that facilitates the building of social networks or social relations among people and other entities such as corporations. Social networking system 106 allows users to designate other users or entities as connections, or otherwise connect to, or form relationships with, other users or entities. Additionally, users contribute and interact with their connections, use applications, join groups, list and confirm attendance at events, invite connections, or perform other tasks that facilitate social interaction. External applications also use the services of the social networking system to allow authenticated users to incorporate some of the above social interactions with use of the external applications.

For managing trending, social networking system 106 may contain trending service 108 and knowledge storage 112. Trending service 108 interacts with knowledge storage 112 to identify trending objects within social networking system 106 and tailor them for display to one or more targeted users. As discussed herein below in detail, knowledge storage 108 may store a variety of information or characteristics that is useful for the tailoring. The social networking system may contain one or more processors to perform operations coordinating with trending service 108 to identify trending objects. It may also include a variety of storage devices, including a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Note in some embodiments, knowledge storage 108 and trending service 112 are integrated into one entity within social networking system 106. In other embodiments, instead of being implemented within, one or both modules are implemented outside but communicatively coupled with social networking system 106.

Social networking system 106 provides trending services by identifying and displaying trending objects. For example, one user of the social networking system may share a uniform resource locator (URL) pointing to a website with her friends, and when the URL is intriguing enough, the URL would be shared by her friends to their friends. When the sharing reaches a certain level determined by trending service 108, trending service 108 displays the shared URL as a trending object at the social networking system (e.g., at the user's page on the social networking system).

Trending objects in a social networking system may take a variety of forms. For example, a trending object can be a hashtag. A hashtag is a word or a phrase associated with a symbol (e.g., prefixed with the symbol #). A user of the social networking system 106 may tag important words/phrases with the symbol in the creation of her message so that others can search for and categorize related topics. A certain level or rate of mentioning of a hashtag may indicate the hashtag is a trending object. A trending object can be a topic an operator of the social networking system created based on contemporary events in the online world or the physical world. When enough users mention the topic, the topic becomes a trending object. A trending object can also be a webpage shared/visited, a group invite, a user profile shared or mentioned, a subscription/following of a user, an application software shared or mentioned, or any other object that the social networking system may use to identify a trend based on popularity of the entity among the users of the social networking system. In some embodiment, these entities (i.e. potential trending objects) are inferred or predicted in accordance with local laws and privacy setting, see for example U.S. patent application Ser. No. 13/167,700, entitled "Inferring Topics from Social Networking System Communications Using Social Context," U.S. patent application Ser. No. 13/167,701, entitled "Inferring Topics from Social Networking System Communications," and U.S. patent application Ser. No. 13/167,702, entitled "Suggesting Tags in Status Messages Based on Social Context," incorporated by reference herein.

A social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system. For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). For example, in response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user. A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept. An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social networking system a request to create an edge between a user node of the user and a concept node of the concept, indicating a relationship between the user and the concept (e.g., the user checks in a restaurant, or the user "likes" a celebrity, etc.). For example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia files to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 2:
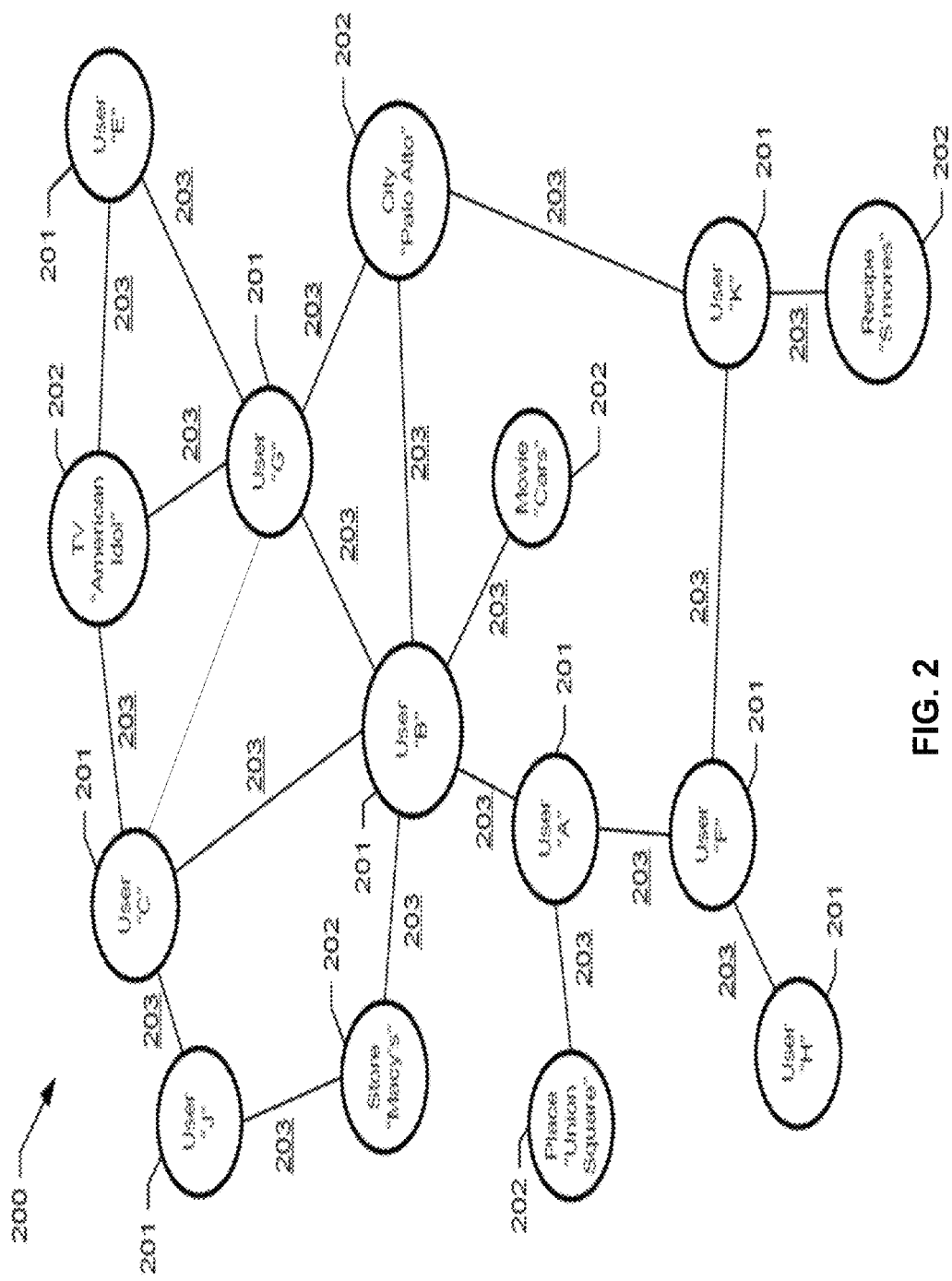
FIG. 2 illustrates an example social graph 200 that may be used by a social networking system.

FIG. 2 illustrates an example social graph 200 that may be used by a social networking system. In the example of FIG. 2, social graph 200 includes user nodes 201, concept nodes 202, and edges 203 between nodes. An edge 203 between a pair of nodes may represent a relationship (or an action) between the pair of nodes. For example, user "G" is a friend of user "B", user "C", and user "E", respectively, as illustrated by the edges between user nodes "G" and "B", between user nodes "G" and "C", and between user nodes "G" and "E." For example, users "C", "E", and G" watch (or "like") a TV show "American Idol", as illustrated by the edges between the "American Idol" concept node and user nodes "C", "E", and G", respectively. Similarly, the edge between the user node "B" and the concept node "Palo Alto" may indicate that user "B" declares "Palo Alto" as his or her city of residence. The edge between the user node "B" and the concept node "Macy's" may indicate that user "B" likes the store "Macy's." Of course, social graphs can be much larger than social graph 200 illustrated in FIG. 2, and the number of edges and/or nodes in a social graph may be many orders of magnitude larger than that depicted herein.

As described earlier, an edge between a pair of nodes may indicate a direct relationship between the pair of nodes. An edge may be directed and connect an ordered pair of nodes. For example, an edge connecting a user node corresponding to a user and a concept node corresponding to a city may be directed (i.e., the user lives in the city). An edge may be undirected, as a pair of nodes connected by the edge does not have a particular order. For example, an edge connecting two user nodes can be undirected as the edge indicates a friendship between two users corresponding to the two user nodes. As described earlier herein, a degree of separation between any two nodes is defined as the minimum number of hops required to traverse the social graph from one node to the other. Thus, for user "B", the nodes for users "A", "C", and "G" are all one hop away and are thus users of first-degree and may be described as "connected to" or "friends" of user "B." However, from the standpoint of user "B", the nodes for users "E", "F", "J", and "K" are considered to have a second-degree of separation because the shortest path from user "B" to any of these nodes requires transiting through one other node. Thus, from the standpoint of user "B", users "E", "F", "J", and "K" are deemed "friends of friends." Accordingly, user "B" is either a "friend" or a "friend of a friend" with every other user in the graph except for user "H", as the shortest path between user "B" and user "H" transits through two user nodes.

Embodiments of a Trending Service

Figure 3:
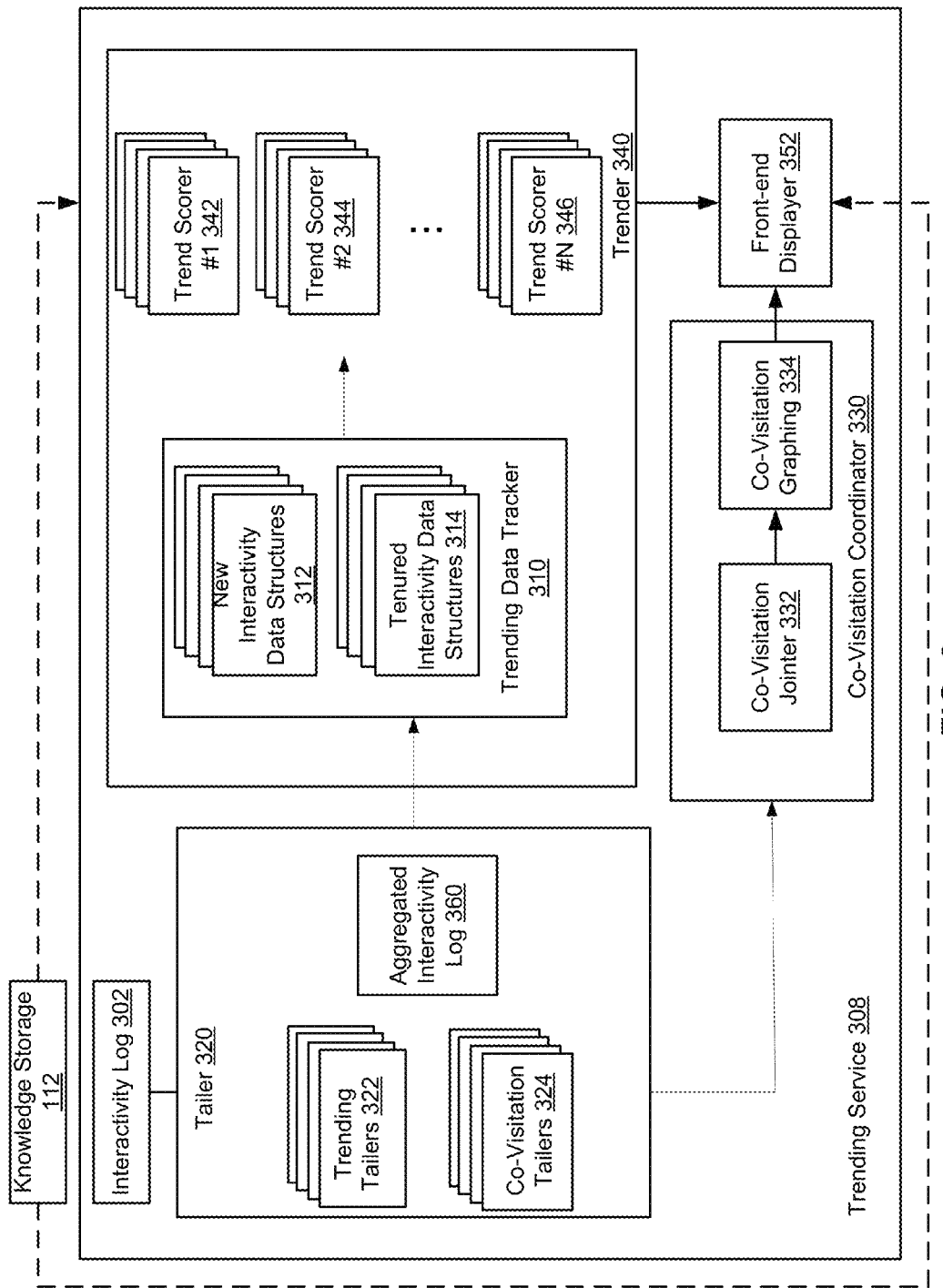
FIG. 3 illustrates a trending service according to one embodiment of the invention.

The description below applies to both social networking systems (such as the one illustrated in FIG. 1 and other online enterprises (websites, etc.). Typically, the more generic term online enterprise is used below, however, the description applies to social networking systems (which are online enterprises). FIG. 3 illustrates a trending service according to embodiments of the invention. Trending service 308 and knowledge storage 112 of FIG. 3 are similar to the identically named blocks of FIG. 1 and they are functional blocks of a social networking system. Trending service 308 interacts with knowledge storage 112 and it contains an interactivity log 302, a trending data tracker 310, a tailer 320, a trender 340, a co-visitation coordinator 330, and a front-end displayer 352 as will be detailed below. One or more blocks within the trending service 308 may be implemented separately or integrated together with one or more other. In addition, one or more blocks may be implemented outside of the trending service 308, but communicatively coupled to the trending service 308 in some embodiments.

In one embodiment, the interactivity log 302 tracks user interactions with the online enterprise and/or users of the online enterprise. Interactivity includes any user action such as sharing, posting, liking, forwarding, commenting, etc. For example, the interactivity log 302 may track which users have posted a text message regarding a professional sports team, shared a link to that team's website, liked, etc. a post, viewed a URL, etc. Interactivity may also include actions taken by a user on sites other than the online enterprise. Interactive (or interactivity) objects are potential trending objects and they will be displayed as trending objects if the trending service 308 determines that they meet certain criteria. A shared URL is used herein to explain the operations of the process as an example. When a user shares (includes activities such as mentioning, forwarding, or recommending) a URL in her message, the interactivity log 302 creates a new entry. The trending data tracker 310 then tracks subsequent instances of other interactivity by users of the online enterprise. For example, the interactivity log 302 would include an entry for "Green Bay" associated with user 1 where user 1 posted "Green Bay is better than Minnesota" on the online enterprise. The trending data tracker 310 would then store subsequent interactions with the online enterprise (either by user 1 or other users) that have the same or similar content.

Tailer 320 pulls interactivity data from the interactivity log 310 and writes an aggregated count over a time period (such as a minute, hour, etc.) to an aggregated interactivity log 360. Tailer 320 contains trending tailers 322 consisting of one or more trending tailers and one or more co-visitation tailers 324. Co-visitation tailers 324 adjust trending data based on multiple activities by a same user within a given time interval and their functionalities are explained in more detail along with co-visitation coordinator 330. Trending tailers 322 adjust trending data without using co-visitation information.

In one embodiment, a trending tailer 322 adjusts trending data by removing instances of interactivity due to a temporal effect. A temporal effect is an effect on interactivity due to at least one of time of a day, day of a week, day of a month, and time of a year. For example, every day around noon, a lot of people with talk about lunch. Lunch is not surfaced as trending by removing its temporal effect. By way of another example, users may post or share a message like "good morning!" in the morning. Such sharing may be considered uninformative as it would unlikely trigger more interaction by users other than a direct recipient of such a message. Thus, the trending tailer 322 may ignore these kinds of instances of interactivity in accumulating (tracking and/or counting) trending data. Trending tailers 322 may remove instances of interactivity due to other temporal effects as well (e.g., "Happy Friday!"). Note some temporal interactivity is likely to induce user interaction and the online enterprise may choose not to remove instances of such interactivity (e.g., sharing about Valentine's Day). The selection of which temporal effect to remove is implementation dependent.

In one embodiment, a trending tailer 322 adjusts trending data by removing instances of spam (referred to as spam filtering). Spam in an online enterprise includes unsolicited bulk messages, especially advertisements, sent indiscriminately and/or repeatedly. Spam filtering can remove repeated sharing within a short period of time. For example, spam filtering can remove repeated instances of sharing from a same user within 30 minutes. In other words, the online enterprise may remove instances of suspicious sharing that it deems spam, regardless of the intent of the sharing users.

In one embodiment, a trending tailer 322 adjusts trending data by providing weights to instances of interactivity depending on the users. Some users are voracious in interactivity, and because of the large volume of content that they generate, their interactivity may elicit less interaction from other users, and the online enterprise may put on less weight on instances of their interactivity. Other users may be more respected for a variety of reasons, and their instances of interactivity may be given more weight because of its potential of more reactions. The weighting of instances of interactivity can increase the usefulness of the eventual trending objects in attracting responses from users. Note the adjustment of instances of sharing may be benefited from accessing data within knowledge storage 112 (e.g., as discussed herein below, temporal data and user data may help the adjustment normalizing temporal efforts and providing weight on instances).

The interactivity data is then further processed at trender 340. In some embodiments, the trender 340 includes a trending data tracker 310 consisting of two kinds of data structures for tracking the instances of interactivity by users. One is new interactivity data structure (one of new sharing data structures 312) configured to accumulate instances of interactivity as objects before the instances of interactivity as objects reach a threshold. Typically, this data is pulled from aggregated interactivity log 360. In one embodiment, the threshold is associated with a certain number of instances of interactivity during a monitoring time period. That is, new interactivity data structures 312 accumulate instances of interactivity before the interactivity rate reaches a certain level. If the number of instances of interactivity passes the threshold during the monitoring time period, accumulation of the instances of interactivity moves to a tenured interactivity data structure (one of tenured interactivity data structures 314). One reason for the two-tiered interactivity data structures is to reduce computation time so that only probable trending objects (vs. all possible trending objects) are further processed within the trending service 308. The threshold or the level of interactivity rate is configurable, for example, by a system administrator. In some embodiments, if an interactivity object does not have the requisite number of interactions, it is removed from the new interactivity data structures 312. This removal may be done using many different algorithms including, but not limited to, least recently used, oldest, etc.

At tenured sharing data structures 314, interactivity objects are accumulated in a variety of time intervals, such as one minute, five minutes, one to 24 hours, days, or weeks. An implementation detecting trending objects in a variety of time intervals can pinpoint existence of trending at different time resolutions. In some embodiments, the tenured interactivity data structures 314 are of a set size. In these embodiments, when a new interactivity object is added, another object must be removed. The may be accomplished in many ways such as a first in, first out fashion, least recently used, smallest number of interactions, etc.

In some embodiments, new and/or tenured sharing data structures contain hierarchies to make trending data tracker more efficient. New and/or tenured sharing data structures may also take a variety of forms. For example, the data structures may be implemented as heaps, hashes, records, or hash-heaps.

Trender 340 contains multiple trend scorers illustrated in FIG. 3 as trend scorers #1 to N at references 342 to 346 respectively. Each trend scorer 342-346 within trender 340 scores and ranks shared objects. Each trend scorer 342-346 is given a group of shared objects to rank. In one embodiment, trender 340 gets the information from knowledge storage 112 for grouping interactivity objects. The grouping of interactivity objects may be based on demographic information of the users. For example, trend scorer #1 at 342 may rank objects shared by users within the US or within a city of the US. At each trend scorer 342-346, for each object a trending score is calculated based on changes of the number of interactions over a time period. The trending score is a measure of divergence of the interactivity of a particular object during the time periods.

A variety of algorithms for measuring information divergence (also known as information gain or relative entropy) may be used to derive the trending scores. For example, a trend scorer may calculate a Kullback-Leibler divergence score based on the counts of instances of interactivity at a current time period and at the same time slot of the previous day. The fraction of interactivity in the current time period can be denoted as p, and the fraction of interactivity at the same time slot of the previous day can be denoted as q, the Kullback-Leibler divergence score is then expressed as:

$$\text{Divergence Score} = p \times \log(p/q) + (1-p) \times \log((1-p)/(1-q))$$

The divergence scores of each of the group of interactivity objects are calculated and ranked at the trend scorers, and the top ranked interactivity objects of each trend scorer within trender 340 are identified for front-end displayer 352. Note at each trend scorer, a set of scores may be calculated for a set of time windows such as one minute, 5 minutes, one hour, a day, a week, or even longer. The number of identified top ranked shared objects at each time window may vary at different trenders depending on implementation. Also, trending scores may be calculated using algorithms other than the Kullback-Leibler divergence scores.

Based on the trending scores of shared objects at various trend scorers, front-end displayer 352 determines which of the interactivity objects are to be displayed as trending objects to users. Front-end displayer 352 may consider a variety of factors to make this determination. In some embodiments, it considers demographic information of the users. That is, front-end displayer 352 selects trending objects considering at least one of the user's location, gender, race, national origin, religion, age, marital status, disability, sexual orientation, education level, and socioeconomic status. For example, for male users within the United States, one set of trending objects is displayed, and a different set of trending objects may be completely different from ones for female users within South Africa. The tailored display is possible as front-end displayer 352 has access to knowledge storage 112, which contains user data as discussed in more details herein below. Note the locations of the users can be determined by the online enterprise of the users (e.g., based on user profiles) or physical location of the users (e.g., based on detected locale of the device used by the user). Also, the tailored display can be fine-tuned to specific demographics, for example, a set of trending hashtags may be particularly selected for a married male in his 40s with college education in the Washington D.C. region. In some embodiments, in addition to, or in lieu of demographics, trending objects may be ranked by a user's (social) interest such as social interactions (like, share, comment, etc.) with pages on or off of the online enterprise. As such, a user is presented with trending objects that more align with his/her interests.

Front-end displayer 352 may select the set of trending objects further based on a user's past activities. A user's past activities include posting/sharing messages of particular content, interacting with past trending objects (e.g., click-through rate (CTR) of past trending objects), updating profiles containing particular keywords), etc. Continuing the previous example, the set of trending hashtags may be further tailored to a married male in his 40s with a college education in the Washington D.C. region that has a high CTR of past trending objects relating to politics. The personal tailoring may interact with the ranking of trending objects. Continuing the example above, a URL relating to an election of Congressional District 6 of the state of Washington may have a lower trending score than a URL relating to an election of a Virginia senator for the particular demographic (a married male in his 40s with college education in the Washington D.C. region). However, if a user has posted a number of messages relating to congressional politics of the state of Washington before, the former URL may be selected as a trending object for the user over the latter URL, despite the former's lower trending score.

In addition, the selection of trending objects may be based on past activities of users within a community that the user belongs to. For example, a trending invite may be displayed to the user if a number of users within a community the user belonging to have accepted the invite. Community based trending display enhances interactivity chances within a user's social/professional circles.

In one embodiment, the selection of trending objects is a blending of interactivity objects with high trending scores across multiple time windows. An interactivity object with a high trending score within one minute may be displayed along with an interactivity object with a high trending score within one day. Blending trending of various time windows provides users with trending of the moment without missing more enduring trends. This allows for a mix of fresh and popular trends. For example, 3, 8, and 24 hour windows may be used and are compared against the same periods in the past (such as yesterday and last week).

In one embodiment, front-end displayer 352 detects acceleration of interactivity and displays such interactivity as a trending object. For example, a shared object has a much higher trending score at current one minute time window than the one at current five minute time window, and the trending score at the current five minute time window is already materially higher than the one at the current one hour time window. Front-end displayer 352 determines that the interactivity object is accelerating, and display the sharing as a trending object, with or without marking it as distinct from other trending objects. Earlier trend detection based on acceleration helps the social networking system spot a trending object early and allows a user to interact with the trending object providing a more engaging environment.

The trending objects identified are the more popular objects within online enterprise. Yet popularity is not equivalent to novelty. Multiple popular objects may be related to a single topic and displaying all of them may corrode user's interest. For example, during the last day of the National Basketball Association (NBA) playoff games, interactivity objects relating to the NBA and the teams at the particular NBA final game are popular. As a result, assuming shared objects with the highest 5 trending scores are: NBA final, Heat Nation, The Voice, LeBron James, and Spurs. Four out of 5 of these objects are related to the same topic, and displaying them indiscriminately along with the only non-basketball topic (The Voice) may indulge a basket fan while alienating a user is not as keen on professional basketball games.

One way to balance popularity with novelty is through co-visitation coordination. In one embodiment, tailer 320 contains co-visitation tailers 324. A co-visitation tailer examines users' activities at the time of sharing one or more objects. For example, co-visitation tailer examines all of the URLs a user has visited during the five minute time period of an interactivity object and adjusts the instances of visits of all the URLs similarly as trending tailers 322. The co-visitation data is then processed at co-visitation coordinator 330. Within co-visitation coordinator 330, co-visitation jointer 332 joins a particular user's activities together and stores them with a key labeled for the particular user. Through the jointer 332, co-visitation coordinator 330 forms a user-to-activity map keyed by users. Then co-visitation graphing module 334 builds a graph based on the jointer, and sorts the activities. Through sorting, interactivity objects of same/similar topics are identified. Users tend to perform activities relating to a topic around the same time, examining co-visitation data can identify such topics. The produced graph (or data) is then sent to front-end displayer 352 to determine the proper format to display trending objects.

In one embodiment, same/similar topics are clustered together as one trending object by using co-visitation information. Continuing the example with the highest 5 trending scores being NBA final, Heat Nation, The Voice, LeBron James, and Spurs, the system may group basketball related topics under a single trending object. The selection of the representative trending object among a cluster of trending objects may be based on trending scores in one embodiment. With the clustering, only two trending objects are selected (NBA Finals and The Voice) and the front-end displayer may display additional trending objects to round up the top five trends. When a user selects a particular trending object, the trending cluster is displayed, including trending objects removed from the top tier of trending objects based on co-visitation data. With tiered trending objects, the system provides a balance between popularity and novelty in displaying trending objects. The grouping may be done across trending categories for example, a presentation of a mix of trending hashtags and topics to the user by utilizing co-visitation service (data) may be done. An example of such a group is: #JKIA (hashtag); Jomo Kenyatta International Airport (topic); and #JKIAFire (hashtag).

Note knowledge storage 112 may feed to tailer 320, trender 340, and front-end displayer 352. Knowledge storage 112 contains various user information data that can be used in various stages of trending identification and display process. In some embodiments, knowledge storage 112 is a entity outside of and communicatively coupled to trending service 308, but in other embodiments, knowledge storage 112 or subset of knowledge storage 112 is implemented within trending service 308.

While the above description has focused on interactivity with a single online enterprise, in some embodiments of the invention interactions with other online enterprises are looked at for trending purposes. For example, a second website may be scraped and have its interactivity co-mingled with the first online enterprise in the interactivity log 302, etc. or there may separate data structures for each online enterprise.

Embodiments of Knowledge Storage

Figure 4:
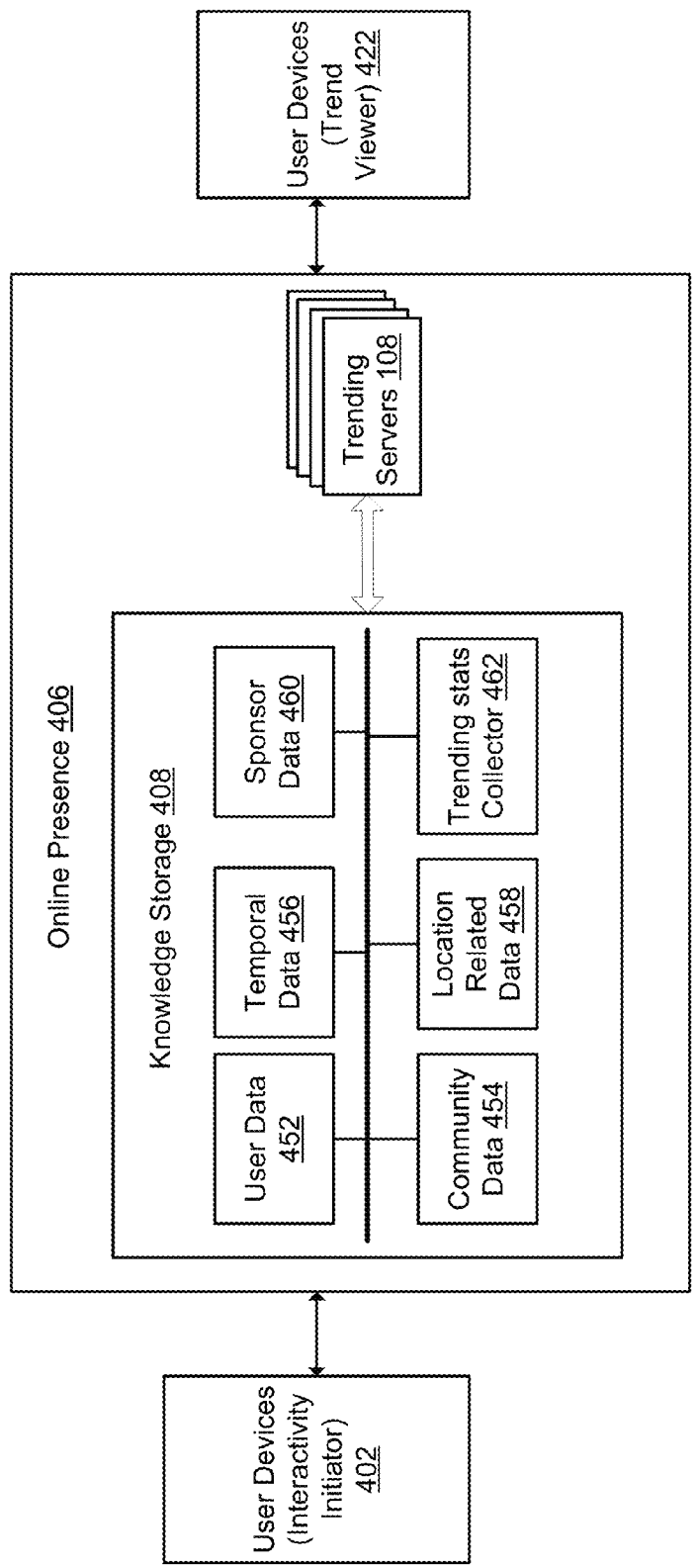
FIG. 4 illustrates knowledge storage according to one embodiment of the invention.

FIG. 4 illustrates knowledge storage according to one embodiment of the invention. Social networking system 406 is similar to social networking system 106 of FIG. 1 and the same or similar references indicate elements or components having the same or similar functionalities. In addition to social network system 406, user devices 402 are used by users to initiate sharing of objects while user devices 422 are used by the users to view the created trending objects. Both user devices 402 and 422 are communicatively coupled to the social networking system 406 and may perform both initiating interactivity and viewing trends at the same time.

Knowledge storage 408 interacts with trending service 108 to identify and display trending objects within an online enterprise 406. In one embodiment, knowledge storage 408 contains user data module 452 (including information about users), community data 454 (including data about communities the users belonging to), temporal data 456 (including data relating to temporal effects), location related data 458 (including information about user location), sponsor data 460 (including information about potential sponsor of sharing/trending objects), and trending statistics collector 462 (including information about past trending objects and user interaction with the past trending objects). Some modules within knowledge storage 408 may be integrated together, and some modules may not be implemented within knowledge storage 408 and they may be implemented as standalone entities that are communicatively coupled to knowledge storage 408.

User data module 452 stores user related characteristics that may include user demographics, user activities, and other user profiling data. The user related characteristics are collected, stored, or used in accordance with the local laws and user's privacy settings. User demographic data includes a user's location, gender, race, national origin, religion, age, marital status, disability, sexual orientation, education level, and socioeconomic status. User activities include messages a user has created and shared, message threads the user has followed, trends the user has interacted, the user communities the user has been actively involved, etc. As discussed herein, this data is useful for customizing a display of trending objects.

Community data module 454 stores community related characteristics. A particular user may belong to one or more communities and community data module 454 includes characteristics of the community that the user belongs to. The characteristics of the community may include demographic composition of locations, genders, races, national origins, religions, ages, marital statuses, disabilities, sexual orientations, education levels, and socioeconomic statuses. In addition, the characteristics of the community may include activities of users in the community including messages posted, forwarded, commented, or rated (e.g., "liked"), and trending objects responded to. Demographic characteristics of a community serve a similar purpose as demographic characteristics of the particular user, and the system may use the general responses by a community the particular user belongs to forecast the interest of the particular user to a trending object.

Temporal data module 456 stores time related characteristics. Temporal data may include characteristics of a particular time of the day, day of the week, month, or year. As discussed herein above, temporal effect may skew instances of sharing of objects and the effect may be normalized. The normalization prevents routine and mundane instances of interactivity from becoming a trending object.

Location related data module 458 stores location data related to a user. Location data may be derived from the user's online enterprise. For example, a user profile may reveal the user's location. The user's online enterprise may not be the same as the user's physical location though. As mobile devices become ubiquitous, many users log in from a mobile device, which may be far away from the user's registered location. Many mobile devices contain location tracking functionalities, and social networking system 406 may collect location information from a mobile device a user uses. Location information may also include other users within a certain radius of the user's current physical location. The collected location information may be stored in located related data module 458 and be used for selecting of trending objects.

Sponsor data module 460 stores characteristics related to sponsors of trending objects. A third party sponsor may have a certain criteria for targeted advertisement relating to trending objects, and the criteria may be stored in sponsor data module 460. A sponsor may target certain demographics for a certain promotion, and social networking system 406 can match the sponsor's request stored in sponsor data module 460 with user data module and/or community data module 454 and generate advertisement within the page of displaying trending objects.

Trending statistics collector 462 collects statistics associated with trending objects. The collected statistics may include how often a user reacts to past trending objects and the types of trending objects the user interacts to. The collected statistics can be used in various ways in social networking system 406. It may help the system to learn a user's preferred interactivity objects based on the types of trending objects the user tends to response. It may also help the system to learn a user's likely time window (weekday or weekends, morning or night, etc.) to interact with trending objects. The collected trending statistics not only helps better targeting of generating tailor trending objects, but also it may be useful to provide the information to potential sponsor of trending objects in accordance with the local laws and user's privacy settings.

Embodiments of Methods of Trending Optimization

Figure 5:
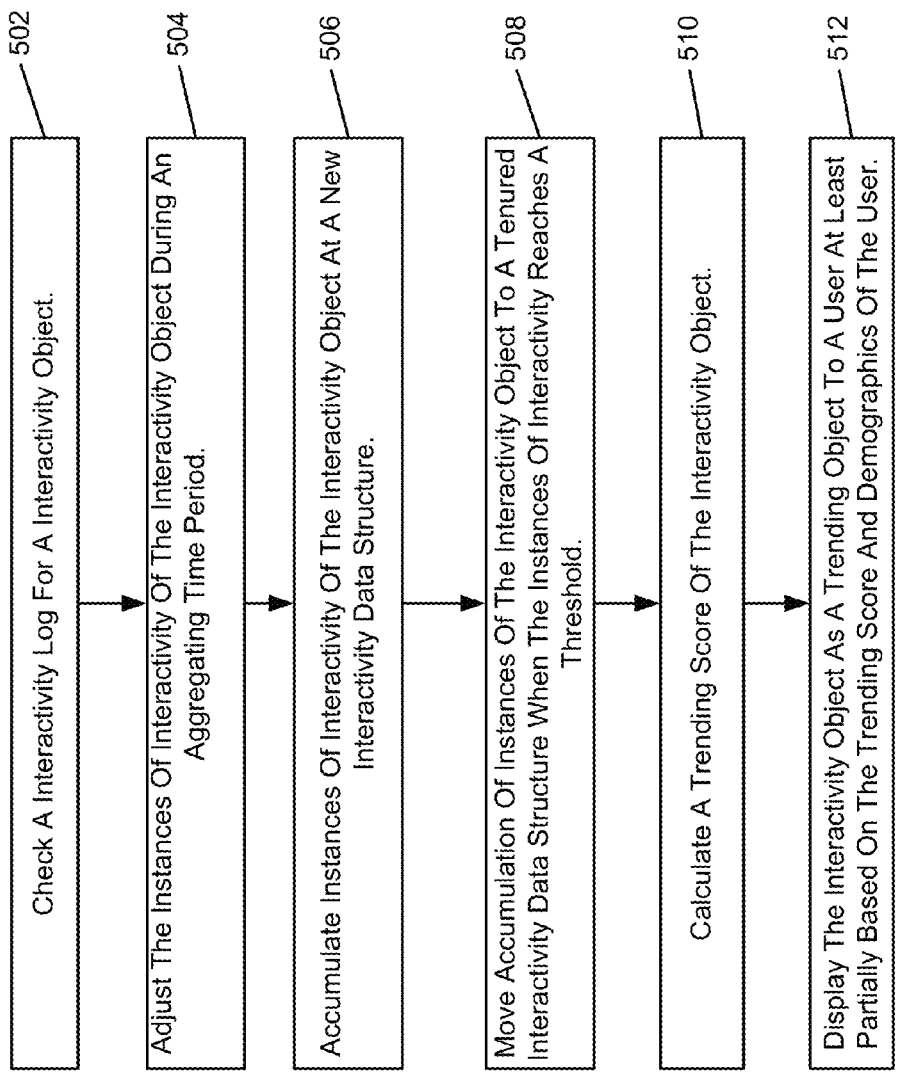
FIG. 5 is a flow diagram illustrating a social networking system providing a trending service according to one embodiment of the invention.

FIG. 5 is a flow diagram illustrating an online enterprise providing a trending service according to one embodiment of the invention. At block 502, the online enterprise checks an interactivity log to identify an interactivity object. The interactivity log records the interactivity object by creating a new entry in one embodiment when a user interacts with the system.

At reference 504, a tailer adjusts the instances of interactivity of the interactivity object by the users during an aggregating time period. In one embodiment, a trending tailer adjusts trending data by removing instances of interactivity due to a temporal effect. The instances of interactivity due to the temporal effect are considered not informative thus unlikely to trigger interaction by other users. In one embodiment, a trending tailer adjusts trending data by removing instances of spam, where the system deems repeated sharing within a short period of time by the same user or with very similar content as being spam. In one embodiment, a trending tailer adjusts trending data by providing weights on instances of interactivity depending on the sharing users. One or more adjustments may apply to a set of trending data to normalize the set of trending data.

Instances of interactivity with the object by users of the online enterprise during a monitoring time period are then accumulated through a new interactivity data structure at block 506. The accumulation of the instances is then moved to a tenured interactivity data structure at block 508, once the instances of interactivity reach a threshold. Note the new and tenured interactivity data structures may take a variety of forms. For example, the data structures may be implemented as heaps, hashes, records, or hash-heaps.

Then at reference 510, a trend scorer calculates a trending score of the interactivity object based on a number of instances of sharing during the aggregating time period and a reference number of instances of interactivity during a previous time period. The trending score is a measure of divergence of interactivity of a particular object during the time periods. A variety of algorithms for measuring information divergence (also known as information gain, relative entropy) may be used to derive the trending score and the Kullback-Leibler divergence score is used in one embodiment.

At reference 512, the system displays the interactivity object as a trending object to another user at least partially based on the trending score of the object and demographic information of the other user. The displaying of the object as a trending object may be based on a comparison of trending scores of the object and other objects that results in the object having the highest trending scores for the demographic of the other user in one embodiment.

Figure 6:
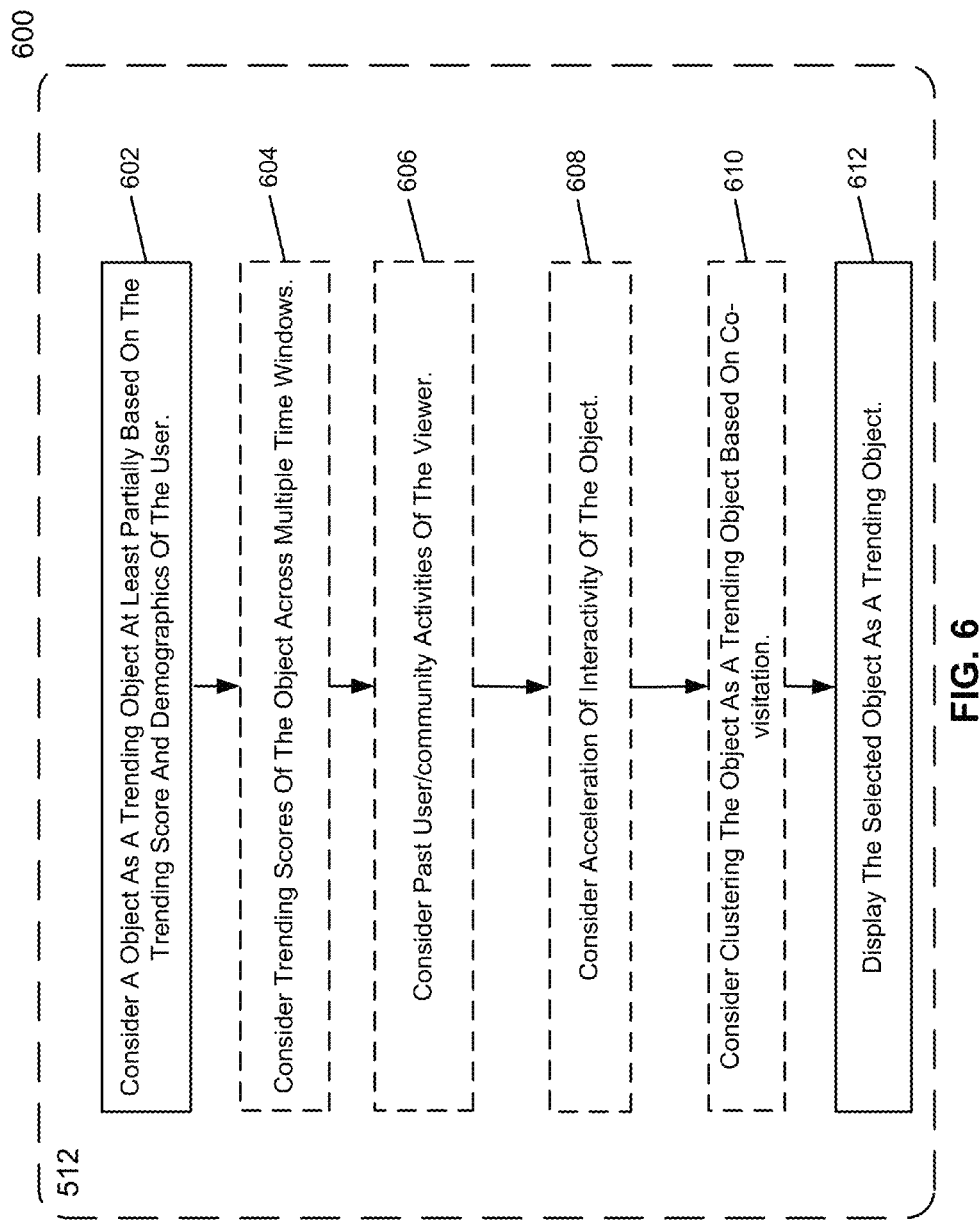
FIG. 6 illustrates the selection of the shared object as a trending object of a social networking system according to one embodiment of the invention.

The displaying of the interactivity object as a trending object may be further based on other factors. FIG. 6 illustrates the selection of the object as a trending object of a social networking system according to one embodiment of the invention. Note blocks 602 to 612 of FIG. 6 represents an embodiment of block 512 (shown as a dotted block) of FIG. 5. The orders of blocks 602 to 610 may be different depending on the implementation, and blocks 604 to 610 are optional.

At block 602, a front-end displayer considers an interactivity object as a trending object for displaying to a user at least partially based on the trending score of the object and demographics of the user. Then at block 604, the front-end displayer considers trending scores of the object across multiple time windows. Thus, a highest score at one time window may not guarantee the object to be displayed as a trending object. The object competes with other shared objects for limited placement of trending objects.

At block 606, the front-end displayer considers the viewer of the target object and examines past activities of the viewer's and the viewer's community. The past user/community activities are known by the system (e.g., through knowledge storage 112 of FIG. 1). This step aims at further personalizing trending object for the viewer.

At block 608, the front-end displayer considers acceleration of trending of the object. A object with accelerated sharing is more likely to be selected as a trending object than another shared object with more even paced sharing. The acceleration consideration allows the system detect trending earlier thus users may interact with a trending object as the trend is forming.

At block 610, the front-end displayer considers clustering the object as a trending object with one or more trending object based on co-visitation of users of the system. Once the object is determined to be a trending object, it may share the same or similar content with another trending object. The same or similar content is identified through co-visitation data of the users. Only unique content is shown as trending objects at the top tier after clustering in a multi-tiered trending object display. Through block 610, the hierarchy of displaying trending object is determined.

Then at block 612, the front-end displayer displays the selected shared object as a trending object. The trending object is display at a page/location visible by the viewers (such as user devices 422 of FIG. 4) using a variety of graphic user interfaces (GUIs).

Note the variety of embodiments discussed herein above is not meant to be an exhaustive list of possible embodiments, and they are only illustrations of the underlying principle.

Snapshots of a Trending Optimization Embodiment

Figure 7:
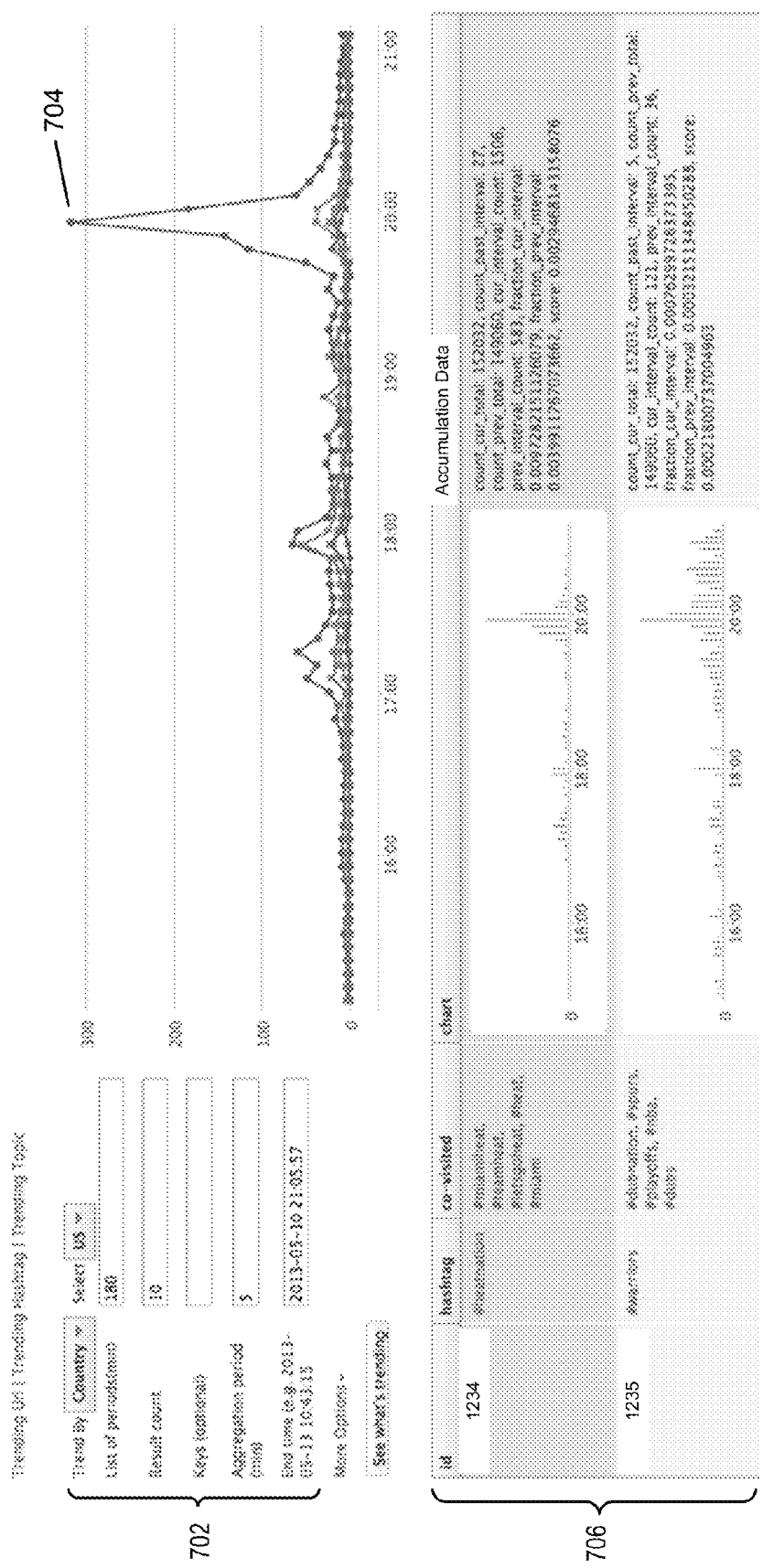
FIG. 7 is a snapshot of accumulating shared hashtags according one embodiment of the invention.
Figure 8:
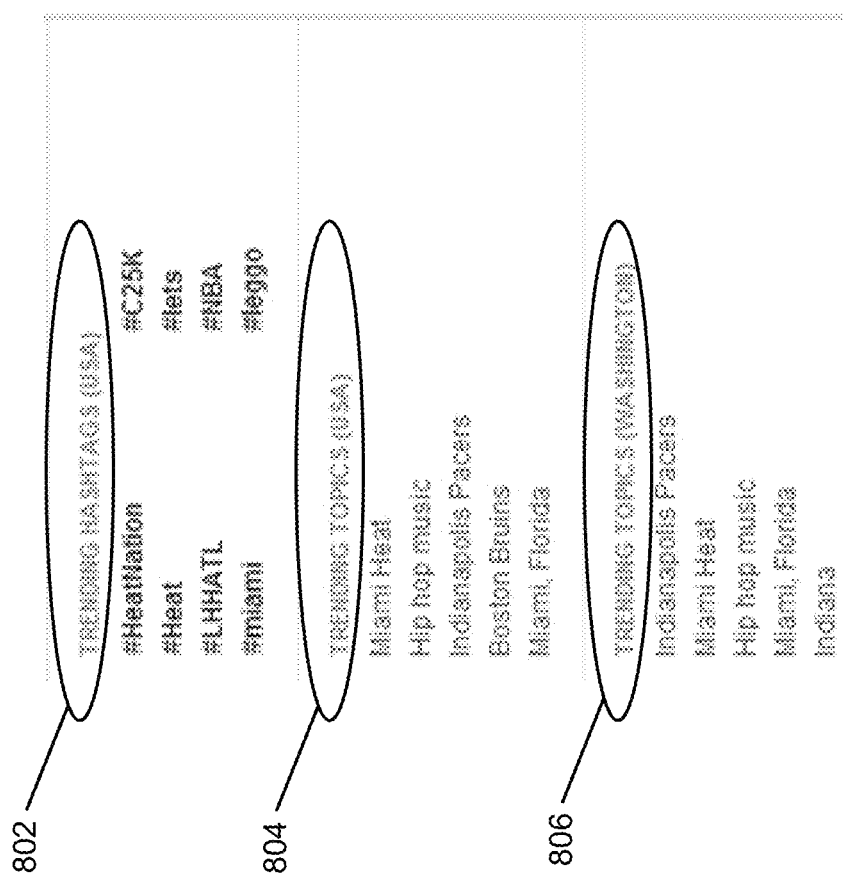
FIG. 8 is a snapshot of displaying trending objects according to one embodiment of the invention.
Figure 9:
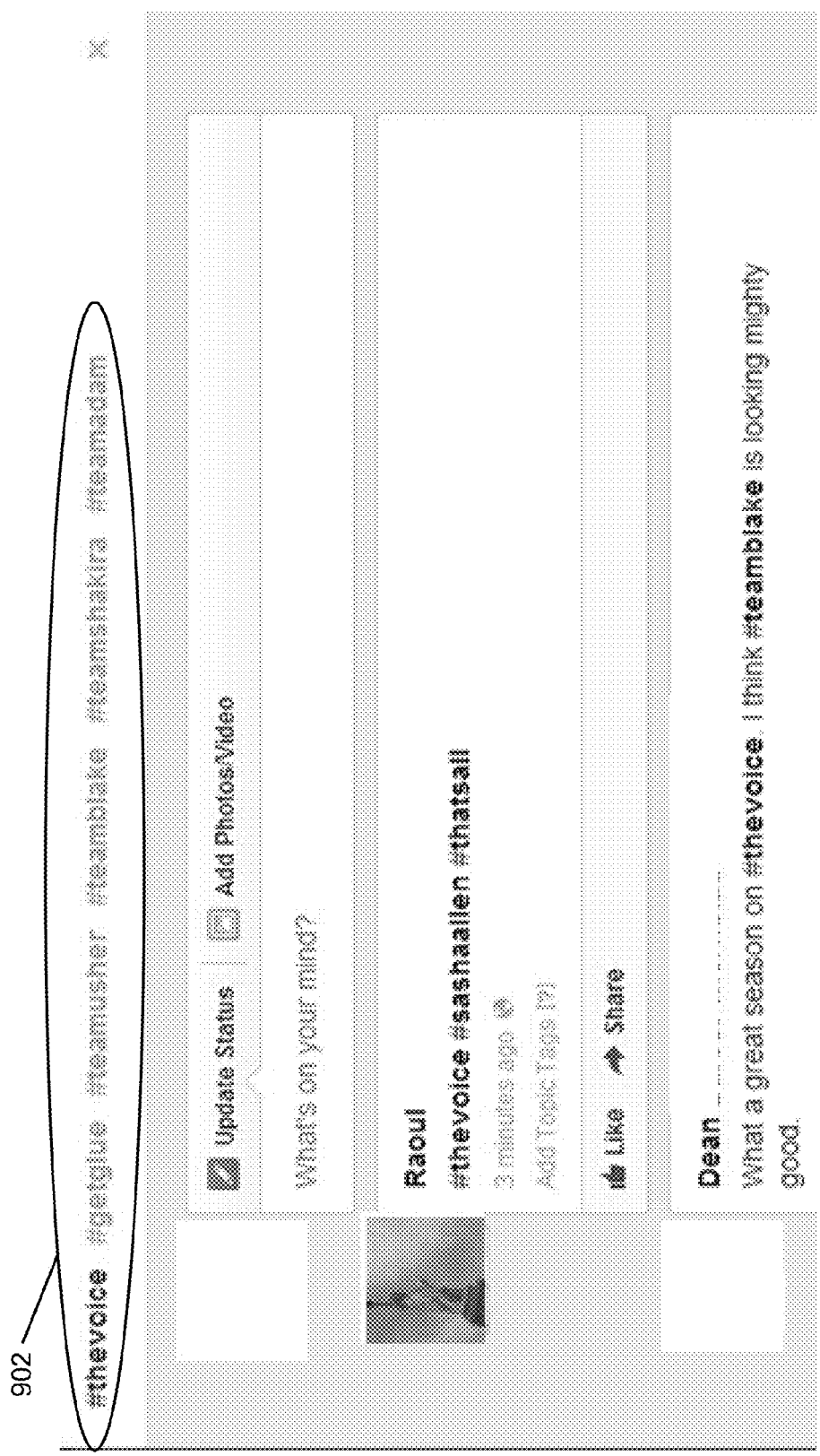
FIG. 9 is a snapshot of clustered trending objects according to one embodiment of the invention.

FIGS. 7-9 illustrate a set of snapshots of a trending optimization implementation according to one embodiment of the invention. The embodiment selects trending hashtags and topics.

FIG. 7 is a snapshot of accumulating interactivity using hashtags according one embodiment of the invention. The parameters of the accumulation is listed at reference 702, which shows the instances are accumulated based on country, and the data collected is for sharing within US. The list period, time resolution (aggregation period (minute)), and other parameters are illustrated in the figure. The accumulation of a hashtag is displayed at reference 704, where the instances of sharing of the hashtag reach a peak at around 20:00. At reference 706, two shared hashtags are shown, along with their respective co-visited hashtags. The accumulation data are used to select trending hashtags.

FIG. 8 is a snapshot of displaying trending objects according to one embodiment of the invention. At reference 802, eight trending hashtags of the United States are displayed. Then at reference 804, five trending topics of the United States are displayed. In this example, trending hashtags are based on user created hashtags (thus user-created trending) while trending topics are trending content the social networking system generated based on user interactions and other factors (thus system-created trending). At reference 806, five trending topics for the state of Washington are displayed for users associated with that state.

FIG. 9 is a snapshot of clustered trending objects according to one embodiment of the invention. At reference 902, #thevoice is the trending object, but other trending objects are clustered with #thevoice based on users co-visitation data. Thus, when a user selects #thevoice to get more information, she will be able to see content based on sharing of #getglue, #teamusher, #teamblake, #teamshakira, and #teamadam.

Figure 10:
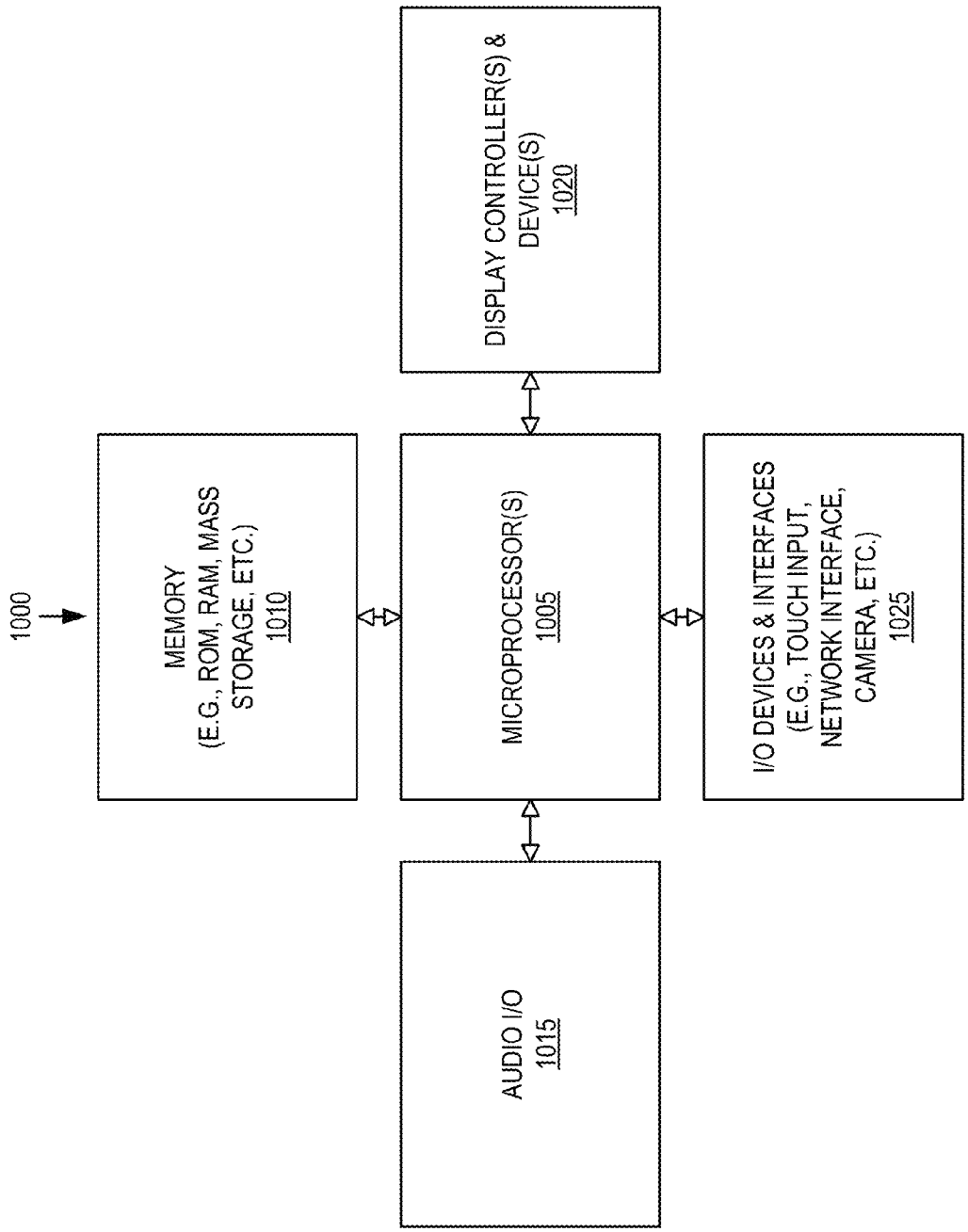
FIG. 10 illustrates a computing system in which embodiments may operate, be installed, integrated, or configured.

FIG. 10 illustrates, in block diagram form, an exemplary computing system 1000 in accordance with which embodiments may operate, be installed, integrated, or configured. The computing system 1000 includes one or more microprocessors 1005 and connected system components (e.g., multiple connected chips). Alternatively, the computing system 1000 is a system on a chip.

The computing system 1000 includes memory 1010, which is coupled to the microprocessor(s) 1005. The memory 1010 may be used for storing data, metadata, and programs for execution by the microprocessor(s) 1005. The memory 1010 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1010 may be internal or distributed memory.

The computing system 1000 also includes an audio input/output subsystem 1015 which may include a microphone and/or a speaker for, for example, playing back music or other audio, receiving voice instructions to be executed by the microprocessor(s) 1005, playing audio notifications, etc.

A display controller and display device 1020 provides a visual user interface for the user. In an embodiment where the computing system 1000 is an exemplary representation of the user device 102 of FIG. 1, the display device 1020 may display the GUI windows illustrated in FIGS. 6, 7, and 8A-B.

The computing system 1000 also includes one or more input or output ("I/O") devices and interfaces 1025, which are provided to allow a user to provide input to, receive output from, and otherwise transfer data to and from the system. These I/O devices 1025 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the computing system 1000.

The I/O devices and interfaces 1025 may also include a connector for a dock or a connector for a USB interface, FireWire, Thunderbolt, Ethernet, etc. to connect the computing system 1000 with another device, external component, or a network. Exemplary I/O devices and interfaces 1025 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the computing system 1000 with another device, external component, or a network and receive stored instructions, data, tokens, etc. It will be appreciated that one or more buses, may be used to interconnect the various components shown in FIG. 10.

In one embodiment, the computing system 1000 is an exemplary representation of the user device 102 of FIG. 1. The computing system 1000 may be a personal computer, tablet-style device, a personal digital assistant (PDA), a cellular telephone with PDA-like functionality, a Wi-Fi based telephone, a wearable computing device, a handheld computer which includes a cellular telephone, a media player, an entertainment system, or devices which combine aspects or functions of these devices, such as a media player combined with a PDA and a cellular telephone in one device. In another embodiment, the computing system 1000 is an exemplary representation of a server computer in the social networking system 106 of FIG. 1. In other embodiments, the computing system 1000 may be a network computer, server, or an embedded processing device within another device or consumer electronic product. As used herein, the terms computer, system, device, processing device, and "apparatus comprising a processing device" may be used interchangeably with the computing system 1000 and include the above-listed exemplary embodiments.

It will be appreciated that additional components, not shown, may also be part of the computing system 1000, and, in certain embodiments, fewer components than that shown in FIG. 10 may also be used in a computing system 1000. It will be apparent from this description that aspects of the inventions may be embodied, at least in part, in software. That is, computer-implemented methods may be carried out in a computer system or other data processing system in response to its processor or processing system executing sequences of instructions contained in a memory, such as memory 1010 or other non-transitory machine-readable storage medium. The software may further be transmitted or received over a network (not shown) via a network interface device 1025. In various embodiments, hardwired circuitry may be used in combination with the software instructions to implement the present embodiments. Thus, the techniques are not limited to any specific combination of hardware circuitry and software, or to any particular source for the instructions executed by the computing system 1000.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

Different embodiments of the invention may be implemented using different combinations of software, firmware, and/or hardware. Thus, the techniques shown in the figures can be implemented using code and data stored and executed on one or more electronic devices (e.g., an end system, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer-implemented method comprising:
   checking an interactivity log of a communication system for an interactivity object, wherein the interactivity log records interaction with the interactivity object when a first user interacts with the communication system regarding the object;
   accumulating by counting, within a new interactivity data structure, instances of interaction with the interactivity object by users of the communication system during a monitoring time period;
   moving the accumulation of the instances of interactivity with the interactivity object to a tenured interactivity data structure in response to the accumulation of instances of interactivity reaching a threshold;

adjusting the accumulation of the instances of interactivity during an aggregating time period;

calculating, using the tenured interactivity data structure, a trending score of the interactivity object based on the tenured and adjusted accumulation of instances of interactivity during the aggregating time period and a reference number of instances of interactivity during a previous time period; and displaying the interactivity object as a trending object of the communication system to a second user at least partially based on the trending score of the interactivity object and demographic information of the second user.

2. The computer-implemented method of claim 1, wherein moving the interactivity object to a tenured interactivity data structure further comprises removing another object from the tenured interactivity data structure.

3. The computer-implemented method of claim 1, wherein adjusting the instances of interaction of the interactivity object by users of the communication system comprises:

discarding an instance of interaction of the interactivity object if the instance is determined to be
interactivity caused by a temporal effect, wherein the temporal effect is an effect on interactivity due to at least one of time of a day, day of a week, day of a month, and time of a year.

4. The computer-implemented method of claim 1, wherein displaying the interactivity object is further based on co-visitation by the users of the communication system, wherein co-visitation is one or more objects accessed by a same user during a determined time period, and wherein one of the one or more objects co-visited by the users of the communication system are displayed along with the interactivity object as a cluster.

5. The computer-implemented method of claim 1, wherein displaying the interactivity object is further based on a trending score of the interactivity object during a time window other than the aggregating time period.

6. The computer-implemented method of claim 1, wherein displaying the interactivity object is further based on past activities of the second user or past activities of users within a community to which the second user belongs.

7. The computer-implemented method of claim 1, wherein displaying the interactivity object is further based on a location of the second user.

8. The computer-implemented method of claim 1, wherein displaying the interactivity object is further based on a measure of acceleration of number of instances of interaction during the calculating time period.

9. The computer-implemented method of claim 1, wherein the object is one of a uniform resource locator (URL), a hashtag, a topic, a page, a subscription, an online group, a user profile, and an application software.

10. A non-transitory computer-readable storage medium having instructions stored therein, which when executed by a processor, cause the processor to perform a method, the method comprising:

checking an interactivity log of a communication system for an interactivity object, wherein the interactivity log records interaction with the interactivity object when a first user interacts with the communication system regarding the object;

accumulating by counting, at a new sharing data structure, instances of interaction with the interactivity object by users of the communication system during a monitoring time period;

moving the accumulation of the instances of interactivity with the interactivity object to a tenured interactivity data structure in response to the accumulation of instances of interactivity reaching a threshold;

adjusting the accumulation of the instances of interactivity during an aggregating time period;

calculating, using the tenured interactivity data structure, a trending score of the interactivity object based on the tenured and adjusted accumulation of instances of interactivity during the aggregating time period and a reference number of instances of interactivity during a previous time period; and displaying the interactivity object as a trending object of the communication system to a second user at least partially based on the trending score of the interactivity object and demographic information of the second user.

11. The non-transitory computer-readable storage medium of claim 10, wherein adjusting the instances of interaction of the interactivity object by users of the communication system comprises:

discarding an instance of interaction of the interactivity object if the instance is determined to be interactivity caused a temporal effect, wherein the temporal effect is an effect on interactivity due to at least one of time of a day, day of a week, day of a month, and time of a year.

12. The non-transitory computer-readable storage medium of claim 10, wherein displaying the interactivity object is further based on co-visitation by the users of the communication system, wherein co-visitation is one or more objects accessed by a same user during a determined time period, and wherein one of the one or more objects co-visited by the users of the communication system are displayed along with the interactivity object as a cluster.

13. The non-transitory computer-readable storage medium of claim 10, wherein displaying the interactivity object is further based on past activities of the second user or past activities of users within a community to which the second user belongs.

14. A communication system, comprising:

a processing device; and a memory coupled to the processing device, the memory storing instructions which, when executed by the processing device, cause the apparatus to:

record an interactivity when a first user interacts with an object on the communication system;

accumulate, within a new interactivity data structure, a count of instances of interactivity with the interactivity object by users of the communication system during a monitoring time period;

move the count of the instances of interactivity with the interactivity object to a tenured interactivity data structure in response to the instances of interactivity reaching a threshold;

adjust the count of the instances of interactivity during an aggregating time period;

calculate, using the tenured interactivity data structure, a trending score of the interactivity object based on the tenured and adjusted count of the instances of interactivity during the aggregating time period and a reference number of instances of sharing during a previous time period; and display the interactivity object as a trending object to a second user at least partially based on the trending score of the interactivity object and demographic information of the second user; and store the demographic information of the second user.

15. The communication system of claim 14, wherein adjusting the instances of interaction of the interactivity object by users of the communication system comprises:
    discarding an instance of interaction of the interactivity object if the instance is determined to be interactivity caused by a temporal effect, wherein the temporal effect is an effect on interactivity due to at least one of time of a day, day of a week, day of a month, and time of a year.

16. The communication system of claim 14, wherein displaying the interactivity object as a trending object is further based on co-visitation by the users of the communication system, wherein co-visitation is one or more objects accessed by a same user during a determined time period, and wherein one of the one or more objects co-visited by the users of the communication system are displayed along with the interactivity object.

17. The communication system of claim 14, wherein displaying the interactivity object as a trending object is further based on a trending score of the interactivity object during a time window other than the aggregating time period.

18. The communication system of claim 14, wherein displaying the interactivity object as a trending object is further based on past activities of the second user or past activities of users within a community to which the second user belongs.

19. The communication system of claim 14, wherein displaying the interactivity object as a trending object is further based on a location of the second user.

20. The communication system of claim 14, wherein the object is one of a uniform resource locator (URL), a hashtag, a topic, a page, a subscription, an online group, a user profile, and an application software.

\* \* \* \* \*